United States Patent [19]
Palm

[11] Patent Number: 5,383,753
[45] Date of Patent: Jan. 24, 1995

[54] RIVET FASTENER

[75] Inventor: Erich Palm, Heerbrugg, Switzerland

[73] Assignee: SFS Stadler Holding AG, Heerbrugg, Switzerland

[21] Appl. No.: 971,975

[22] PCT Filed: May 15, 1992

[86] PCT No.: PCT/EP92/01069

§ 371 Date: Mar. 8, 1993

§ 102(e) Date: Mar. 8, 1993

[87] PCT Pub. No.: WO92/22751

PCT Pub. Date: Dec. 23, 1992

[30] Foreign Application Priority Data

Jun. 17, 1991 [DE] Germany .......................... 4119934

[51] Int. Cl.⁶ .................... F16B 13/04; F16B 13/06
[52] U.S. Cl. ............................. 411/29; 411/55; 411/60
[58] Field of Search ..................... 411/29, 30, 31, 42, 411/43, 55, 60, 61, 70, 72

[56] References Cited

U.S. PATENT DOCUMENTS

| | | | |
|---|---|---|---|
| 3,403,593 | 10/1968 | Moore | 411/29 |
| 3,851,560 | 12/1974 | Yago | 411/30 |
| 3,935,786 | 2/1976 | Murray et al. | 411/29 |
| 4,919,579 | 4/1990 | Miyanaga | 411/55 |
| 5,183,357 | 2/1993 | Palm | 411/29 |

FOREIGN PATENT DOCUMENTS 142909  6/1990  Japan ........................... 411/29

*Primary Examiner*—Neill R. Wilson
*Attorney, Agent, or Firm*—Helfgott & Karas

[57] ABSTRACT

A rivet fastener has a rivet housing and a shaft threaded into the rivet housing. The shaft has a head formed at a distal end thereof and being of a greater diameter than the threaded portion of the shaft. The head of the shaft supports a drilling element. The rivet housing is formed of two sections along the axis thereof, of which one section is of a greater diameter than the other one. The section of the greater diameter forms a borehole diameter of the drilling element.

12 Claims, 1 Drawing Sheet

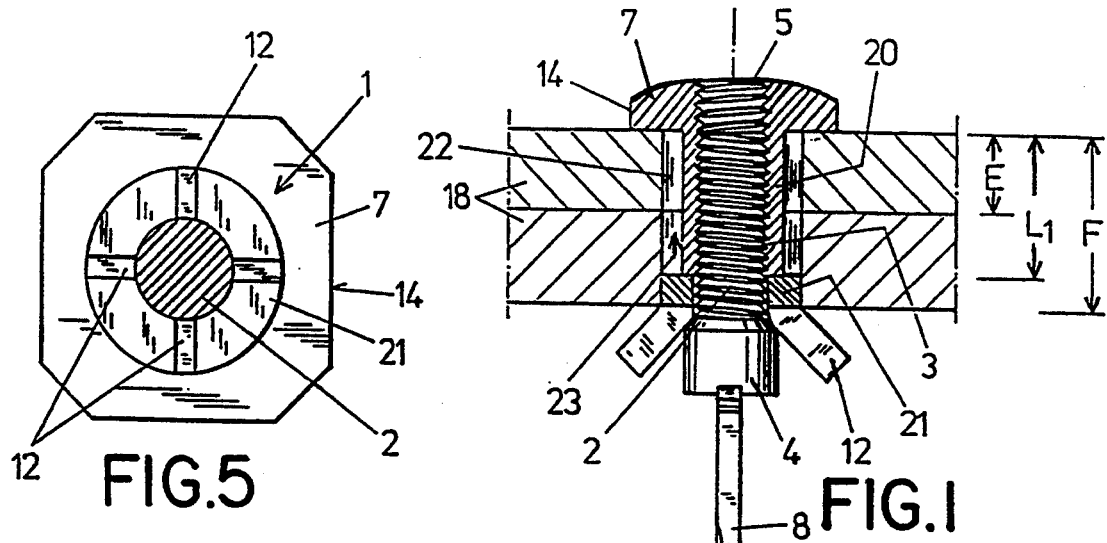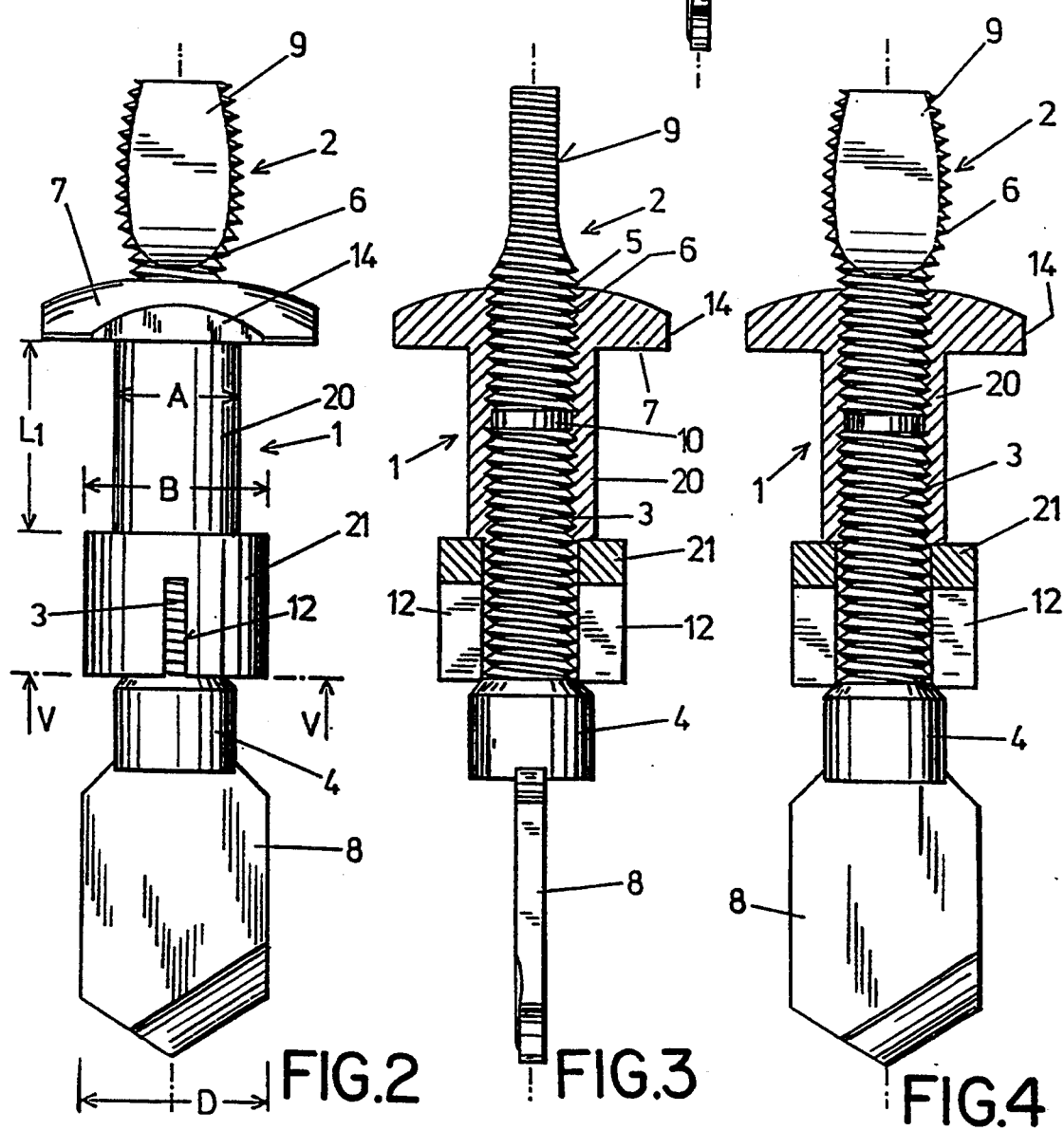

RIVET FASTENER

BACKGROUND OF THE INVENTION

The invention concerns a rivet fastener, consisting of a rivet housing as well as a rivet shaft with a bolt-shaped shank, which can be inserted in the rivet housing and a head arranged or formed on this shank, greater in diameter in relationship to the shank, onto which head is arranged or formed a drilling component, whereby a stop flange is formed onto the rivet housing.

A rivet fastener of this type is described and shown in DE-C1-4,003,373. Known rivet fasteners of this type are employed where two workpieces are to be fastened securely and immovably to each other. The rivet housing is accordingly situated in the hole passing through the two workpieces, such that these two workpieces cannot move relative to each other.

Known rivet fasteners of this type cannot be installed for the mutual fastening of workpieces, which despite the mutual fastening can, or must, move relative to each other and across the longitudinal axis of the rivet fastener. It is precisely necessary, for the mutual fastening of workpieces of different materials, that these be able to move a limited amount, across the axis of the rivet fastener, in order to create, by this means, an equilibrium, in order to compensate, for example, for heat expansion. A necessity of this type exists, for example, for roof and wall casings, whereby the casing or roof elements, consisting of the most varied materials are to be fastened to the secure, e.g. metal-based substructure.

A metal blind rivet has already become known (CH-A-671,617), with which a feasibility of this type can be achieved. In this case, holes of different diameters are drilled in the two workpieces to be fastened. The rivet housing of the rivet fastener is accordingly securely seated in one workpiece and a larger hole is provided in the other workpiece, such that these two workpieces can move relative to each other. For an embodiment of this type, measures must be taken in order to be able to drill holes of differing diameters in a single step. Radially projecting drill-bit wings are provided for, for these embodiment variants, the drilling diameter of which is greater than the drilling component on the front end of the rivet fastener. But a construction of this type cannot be employed for rivet fasteners with a relatively small diameter, whereby on the basis of the deformability alone of the materials forming the rivet shaft, no radially projecting drill-bit wings of this length can be produced.

SUMMARY OF THE INVENTION

It is an object of the present invention to provide a rivet fastener of the type under consideration, with which two workpieces can be fastened to each other, whereby these two workpieces can move relative to each other across the longitudinal axis of the rivet fastener.

In accordance with the invention the fastener has a rivet housing, seen in the direction of its axis, formed of two sections of different diameters or different outer dimensions, whereby one section of a greater diameter or greater outer dimension is provided on the end region of the rivet housing situated opposite a stop flange, and that the section of a greater diameter or greater outer dimension is correspondingly executed to be at least roughly the hole diameter of the drilling component associated with the head of the rivet shaft.

By means of the measures in accordance with the invention, the feasibility has been created of producing a drilled hole with a continuously equal diameter in a workpiece whereby nonetheless the possibility is given that the free end of the rivet housing can spread apart for the setting process of the rivet fastener. It is by this means further ensured that the rivet housing is always centrally installed in the borehole produced, making possible a movement relative to each other, in all directions, of the workpieces fastened to each other.

The measures in accordance with the invention work to a particular advantage precisely for rivet fasteners of the type cited in the introduction, because the region of the rivet housing drawn up for spreading apart in the setting process again corresponds to the hole diameter, such that a sufficiently stable rivet fastening can be produced.

An advantageous embodiment consists in executing the two sections of the rivet housing as components prepared separately. By this means, not only is the easy production of rivet housings with different diameter sections or sections of different outer dimensions enabled, but these means create the feasibility of employing different materials, or raw materials with different raw material textures, or of varying degrees of hardness for the two sections of the rivet housings.

The simplest embodiment consists of having the two sections of the rivet housing follow and bluntly abut each other. Accordingly, for the pre-assembly of the rivet fastener so to say, merely an additional housing is to be inserted, accordingly the section with the greater diameter. Within the scope of the invention it is also conceivable that the two sections of the rivet housing engage each other at their joint. By this means, a pre-assembly of the rivet housing would be feasible in and of itself. For an embodiment of this type it would also be conceivable in accordance with another variation, to fasten both sections of the rivet housing together so as to be twist-proof. This twist-proof fastening can occur solely by means of the sections fitting together, or also by means of a glued, soldered or welded fastening.

For the simplest embodiment variation it is proposed that the two sections of the rivet housing be prepared of the same raw material. For most installations, an appropriate choice of raw material for the rivet housings suffices, such that both sections can be readily prepared of the same raw material.

For particular uses it has nonetheless become feasible by means of the design in accordance with the invention, that the two sections of the rivet housing can be prepared of different raw materials. This yields inherently improved use possibilities and, above all, an inherently broader range of uses.

To this end it is proposed, among other things, that the one section with a greater diameter or greater outer dimension be prepared of an easily workable material, such as aluminum, copper, plastic or rubber. Corresponding to this, different variations of the other section are also possible, whereby it is proposed that the section of the rivet housing with a smaller diameter or smaller outer dimension, which is executed of single piece construction with the stop flange of the rivet housing, be prepared of metal, plastic or wood. The broad range of applications for this type of rivet fastener is already evident from the possibilities yielded by the choice of materials alone.

In order to be able to execute a setting procedure of the rivet fastener simply, and to be able to effect a spreading apart of the free end of the rivet housing, hence the section with the greater outer diameter, it is proposed that the section of the rivet housing with the greater diameter or greater outer dimension, over at least a portion of the length of the end facing away from the stop flange, have at least one breaking line running at least roughly parallel to the axis. The free end region of the rivet housing is spread apart by this means by the further turning of the rivet shaft for embodiment of the final insertion process, so that an orderly rivet fastening can be produced. A construction of this type however, is only advantageous and necessary if the rivet housing is prepared of a correspondingly hard material, or at least of metal.

In this connection the simplest embodiment lies in executing the breaking line(s) as (an) axial buckle(s), groove(s) or slot(s). A quick spreading apart of the rivet housing is possible by this means, because a further twisting of the rivet shaft is supposed to ensure a quick penetration of the rivet shaft's head into the rivet housing.

In order to enable a central setting of the rivet fastener, or to be able to produce a secure rivet fastening, it is of a particular advantage if the section of the rivet housing with the smaller diameter features an axial length that is smaller than the combined thickness of the workpieces to be fastened, yet designed to be greater than the thickness of the workpiece provided immediately adjacent to the stop flange. It is ensured by this means that the section adjacent to the stop flange of the rivet housing permits the same moving of the workpieces across the direction of the axis, and that the section with the greater diameter or greater outer dimension suitably engages in at least a section of one of the workpieces to be fastened.

The invention is explained even further in the following description with the aid of the drawing.

BRIEF DESCRIPTION OF THE DRAWINGS

FIG. 1 is a sectional view showing a rivet fastening with a rivet fastener in accordance with the invention;

FIG. 2 is a plan view of the rivet fastener;

FIG. 3 is a longitudinal section through the rivet fastener;

FIG. 4 is likewise, a longitudinal section through the rivet fastener, but shown twisted 90°, as compared with the representation in FIG. 3;

FIG. 5 is a cross section along line V—V in FIG. 2.

DETAILED DESCRIPTION OF THE PREFERRED EMBODIMENT

The rivet fastener essentially consists of a rivet housing (1) and a rivet shaft (2). The rivet shaft (2) is formed of a bolt-shaped shank (3), and a head (4), arranged or formed on this shank and of a greater diameter than the shank. The rivet housing (1) is provided with an inner thread (5), which is prepared before or during the setting process. The shank (3) of the rivet shaft (2) is provided with a corresponding outer thread (6). One or more flattened areas (14) are distributed on the circumference of one of the stop flanges (7) formed on the rivet housing (1), which are provided as tool gripping surfaces.

A drilling component (8) is arranged or formed on head (4). For the embodiment shown, a small plate-shaped cutting component is provided. It is nonetheless also conceivable to insert here a drilling component of circular cross-section.

Hence, the embodiment represented is a rivet fastener which is to be set by means of a further turning movement after the drilling process.

The drilling direction and the turning direction for tightening the rivet shaft (2) are the same, whereby during the drilling, the inner thread (5) of the rivet housing (1) and the outer thread (6) of the shaft (3) run counter to the turning direction. A left-hand thread is accordingly provided, for a clockwise oriented drilling direction on the shank (3) and on the rivet housing (1). For a counter-clockwise drilling process a right-hand thread on shaft (3) and on the rivet housing (1) is correspondingly provided.

The inner thread (5) on the rivet housing (1) extends over at least a portion of its length. The outer thread (6) on the rivet shaft (2) extends, for the embodiment shown, practically over the entire length of the rivet shaft (2); it can likewise be provided only over a portion of its length.

The rivet housing (1), seen in the direction of its axis, is formed of two sections (20) and (21), whereby these two sections, (20) and (21), feature different diameters (A) and (B), respectively. The section (21) of the greater diameter is provided on the end region of the rivet housing (1) opposite the stop flange (7). The section (21) of the greater diameter (B) is correspondingly executed to be at least roughly the hole diameter (D) of the drilling component (8) associated with the head (4) of the rivet shaft (2).

It was explained, that the two sections (20) and (21) feature different diameters (A) and (B), respectively. It would nonetheless also be conceivable, that these two sections (20) and (21) feature different outer dimensions, because these sections (20,21) need not unconditionally feature a circular cross section. It would accordingly also be conceivable to configure the sections (20) and (21) of the rivet housing (1) with a polygonal or out-of-round cross section, or to otherwise design the one section (20) or (21) to be configured in a circular cross section and the other section (20) or (21), respectively, to be executed with a different cross section.

For the embodiment example shown, the two sections (20,21) of the rivet housing (1) are configured as components prepared separately from each other. This is advantageous for manufacturing reasons, whereby adapting to various employment possibilities is also facilitated. The two sections (20) and (21) bluntly abut against each other in the embodiment form shown, whereby the inner diameter of the section (21) roughly corresponds to the outer diameter of the threads of the rivet shaft (2). Accordingly, the section (21) can be practically slid over the threads, such that the threads do not engage the section (21). This section (21) is accordingly merely provided for the spreading apart process of setting the rivet fastener.

It would also be feasible within the scope of the invention for the two sections (20,21) of the rivet housing (1) to engage each other at their joint. This is practical, by way of example, if the complete rivet housing (1) is to be pre-assembled. It would also be possible in this connection, to fasten the two sections (20,21) to each other so as to be torsion-resistant, for example by gluing, soldering or welding.

The two sections can be prepared of the same raw material or also of different raw materials or of raw materials with different material structures. A design of this type is particularly advantageous if, in order to meet sealing specifications or noise reduction specifications, corrosion protection with the accommodation of differing surfaces is to be considered.

It is also possible in this way for the section (21) with the greater diameter (B) to be prepared of an easily workable material, such as aluminum, copper, plastic or rubber. The section (20) of the rivet housing (1) with the smaller diameter (A), which is executed to be a single unit with the stop flange (7) of the rivet housing (1), can, by way of example, be prepared of metal, plastic or wood.

The section (21) of the rivet housing (1) features, over at least a portion of its length starting from the end opposite the stop flange (7), at least one breaking line running at least roughly parallel to the axis. These breaking lines are executed, for the embodiment form shown, as grooves (12) running parallel to the axis. It would also be conceivable to merely provide one such groove (12) or to otherwise configure breaking lines in the form of indentations or slots. An embodiment of this type inherently improves the setting process, because the free end of the rivet housing (1) can correspondingly spread apart, if the head (4) is drawn into the rivet housing (1) by means of the further turning process of the rivet shaft.

The section (20) of the rivet housing (1) with the smaller diameter (A) features an axial length (L1), which is designed to be smaller than the entire thickness (F) of the workpieces (18) to be fastened, but is nonetheless greater than the thickness (E) of the workpiece (18) provided immediately adjacent to the stop flange (7). The workpiece (18) facing the stop flange (7) can, by this means, move relative to the workpiece (18) situated underneath, even after the setting process of the rivet fastening; such that heat expansion can be compensated for, without occasioning tension cracks or damages to the rivet fastening. Hence, it is always an advantage to install a rivet fastener of this type where dissimilar workpieces (18), accordingly workpieces of different materials or different material textures, are to be fastened to each other.

In the drilling process through the workpieces (18), the drilling component (8) accordingly produces a borehole (22) in the workpieces (18), which in its diameter (D), roughly corresponds to the diameter (B) of the section (21) of the rivet housing (1). The section (21) of the rivet housing (1) engages, over at least a portion of its axial length, the lower end region of the borehole (22) in the workpieces (18). Thus, an annular free space (23) is formed, at least between the upper workpiece (18) and the section (20), such that the two workpieces (18) can move relative to each other across the axial direction of the rivet fastener.

For the proposed invention, the rivet housing is accordingly formed of two sections (20,21) consecutive in an axial direction with different diameters (A) and (B), respectively, or different outer dimensions. For the setting process, that is, for tightening the rivet fastening, these two sections (20) and (21) remain, now as ever, immovable in an axial direction. They are accordingly not slid one over the other as for various familiar rivet fasteners; rather, the section (21) is braced here, by the section (20) in an axial direction so as to be immovable, because only in this manner can an orderly rivet fastening occur in accordance with the invention.

That corresponding breaking points (10) and tool gripping surfaces (9) are at hand on rivet shaft (2), in order to be able to carry out the drilling and setting process, is self-evident, and for this reason will not be more closely considered. The design of the breaking points and of the tool gripping possibilities for the action of a turning tool can be carried out in varying manners.

In the illustration, only the embodiment variation is shown, for which the rivet shaft and a rivet housing are in reciprocal engagement across a screw thread. It is also possible within the scope of the invention, to design rivet fasteners that are to be set by a drawing action in the same way, whereby for example, the section (21) of the rivet housing is likewise executed with expanding straps or is otherwise cylindrically expandable in the setting process.

I claim:

1. Rivet fastener comprising a rivet housing and a rivet shaft including a bolt-shaped shank insertable into said housing and a head formed on said shank and being of a greater diameter than said shank, a drilling component arranged on said head, said housing including a stop flange, said rivet housing (1), as viewed in the direction of an axis thereof, being formed of two sections (20, 21) of different outer dimensions, one section (21) with a greater outer dimension being provided on an end region situated opposite said stop flange (7) of said rivet housing (1) and said one section (21) with a greater outer dimension being correspondingly configured to form at least roughly a borehole diameter (D) of said drilling component (8) associated with said head (4) of the rivet shaft (2), wherein the two sections (20, 21) of the rivet housing (1) are configured as components prepared separately from each other.

2. Rivet fastener according to claim 1, wherein the two sections (20, 21) of the rivet housing (1) follow one another, bluntly abutting each other.

3. Rivet fastener according to claim 1, wherein the two sections (20, 21) of the rivet housing (1) engage each other at a joint therebetween.

4. Rivet fastener according to claim 1, wherein the two sections (20, 21) of the rivet housing (1) are fastened to each other so as to be torsion-resistant.

5. Rivet fastener according to claim 1, wherein the two sections (20, 21) of the rivet housing (1) are prepared of the same material.

6. Rivet fastener according to claim 1, wherein the two sections (20, 21) of the rivet sleeve (1) are prepared of different materials.

7. Rivet fastener according to claim 1, wherein the one section (21) with a greater outer dimension is prepared of an easily workable material selected from the group consisting of aluminum, copper, plastic and rubber.

8. Rivet fastener according to claim 1, wherein the section (20) of the rivet housing (1) with a smaller outer dimension, which is of a single piece with the stop flange (7) of the rivet housing (1), is prepared of a material selected from the group consisting of metal, plastic and wood.

9. Rivet fastener according to claim 1, wherein the section (20) of the rivet housing (1) with a smaller outer dimension has an axial length (L1), which is less than the entire thickness (F) of workpieces (18) to be fastened, but is greater than a thickness (E) of a workpiece (18) provided to be immediately adjacent to the stop flange (7).

10. Rivet fastener according to claim 1, wherein the section (21) of the rivet housing (1) with a greater outer dimension has over at least a portion of the length of the end facing away from the stop flange (7), at least one breaking line running at least roughly parallel to the axis.

11. Rivet fastener according to claim 10, wherein said at least one breaking line is executed as an indentation, a groove (12) or a slot running parallel to the axis.

12. Rivet fastener according to claim 1, wherein said outer dimensions of said two sections are diameters thereof.

* * * * *